S. COHN.
MANTLE TYING MACHINE.
APPLICATION FILED MAR. 14, 1911.
Reissued June 18, 1912.
13,429.
3 SHEETS—SHEET 1.
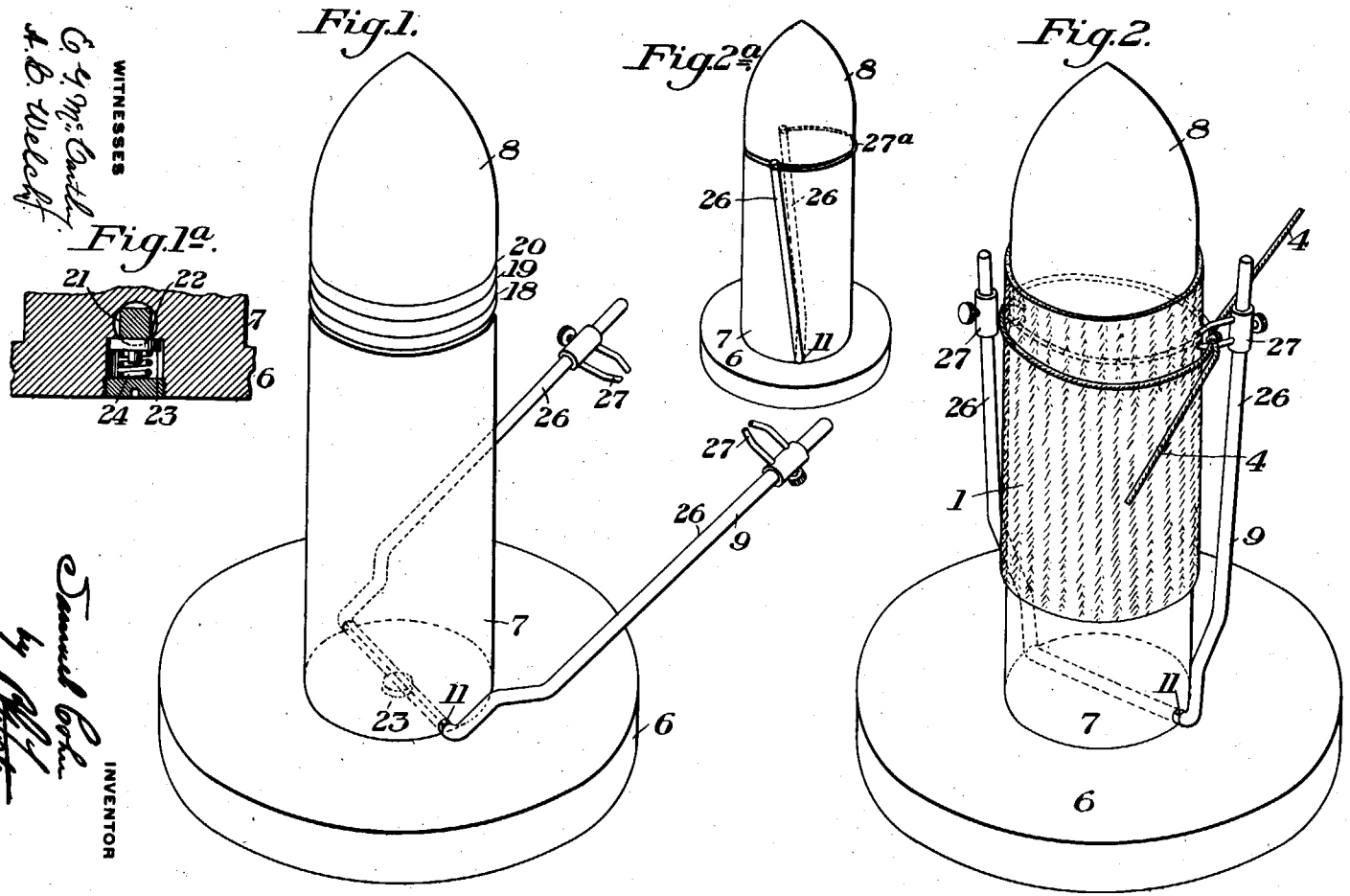
WITNESSES
E. G. McCarthy.
A. B. Welch.
INVENTOR
Samuel Cohn
by B. Porter
Atty.
COLUMBIA PLANOGRAPH CO., WASHINGTON, D. C.

S. COHN.

MANTLE TYING MACHINE.

APPLICATION FILED MAR. 14, 1911.

Reissued June 18, 1912.

13,429.

3 SHEETS—SHEET 2.

WITNESSES

E. G. McCarthy

A. B. Welch

INVENTOR

Samuel Cohn by R. H. Stoker Atty

COLUMBIA PLANOGRAPH CO., WASHINGTON, D. C.

S. COHN.

MANTLE TYING MACHINE.

APPLICATION FILED MAR. 14, 1911.

Reissued June 18, 1912.

13,429.

3 SHEETS—SHEET 3.

WITNESSES

E. G. McCarthy.

A. C. Welch.

Samuel Cohn

INVENTOR by R. H. Foster

Atty

COLUMBIA PLANOGRAPH CO., WASHINGTON, D. C.

UNITED STATES PATENT OFFICE.

SAMUEL COHN, OF NEW YORK, N. Y., ASSIGNOR TO MACHINE MANTLE SEWING COMPANY, OF NEW YORK, N. Y., A CORPORATION OF NEW YORK.

MANTLE-TYING MACHINE.

13,429. Specification of Reissued Letters Patent. Reissued June 18, 1912.

Original No. 918,011, dated April 13, 1909, Serial No. 427,164. Application for reissue filed March 14, 1911. Serial No. 614,459.

*To all whom it may concern:*

Be it known that I, SAMUEL COHN, a citizen of the United States, and a resident of the city, county, and State of New York, have invented a new and useful Improvement in Mantle-Tying Machines, of which the following is a specification.

Heretofore, mantles have been secured to rings by manual labor, the stocking or mantle being first placed so that its mouth is distended, a ring is then inserted in the distended mouth of the mantle, an asbestos string is then passed around the outside of the mantle, its ends are brought together to form a knot and the string is then drawn tight thereby tying a knot and the string then forces the mantle with uneven folds against the ring, the string being in the groove of the ring and the mantle is between the ring and string. Even with the greatest skill this method is clumsy and slow, and the mantle is drawn irregularly about the ring. The mantle is then made true on the ring, a tedious operation requiring great care, reversed over the ring and its open end is then gathered and secured in any desirable manner.

The object of my invention is to provide a suitable device for holding the ring and mantle in proper relation to each other and also a string, so that when the string is tied and its ends drawn so that it is in firm contact with the mouth, the mantle will be forced evenly and perfectly and without injury against the ring where it is securely held, the mantle and ring are then withdrawn from the device, and the mantle is completed as above described. This object is accomplished by my invention, one embodiment of which is more particularly hereinafter described.

For a more particular description of my invention, reference is to be had to the accompanying drawings forming a part hereof, in which—

Figure 3:
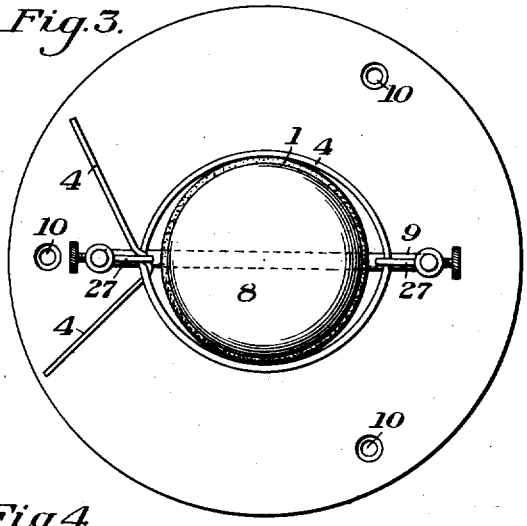
Figure 6:
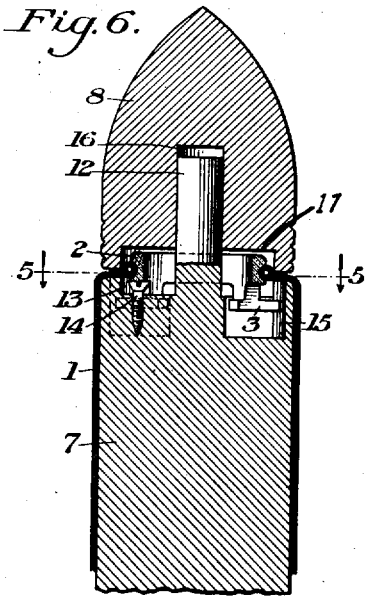
Figure 4:
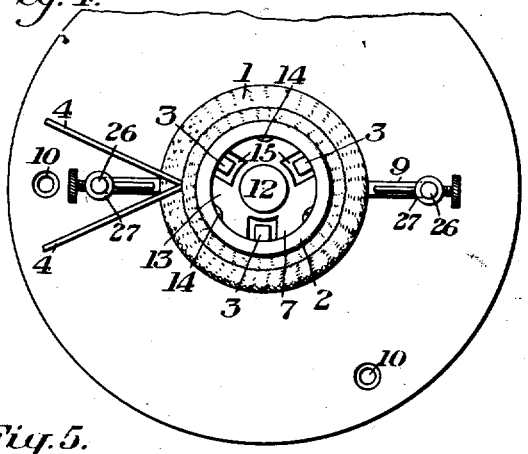
Figure 8:
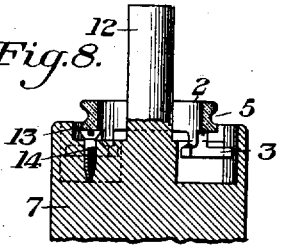
Figure 5:
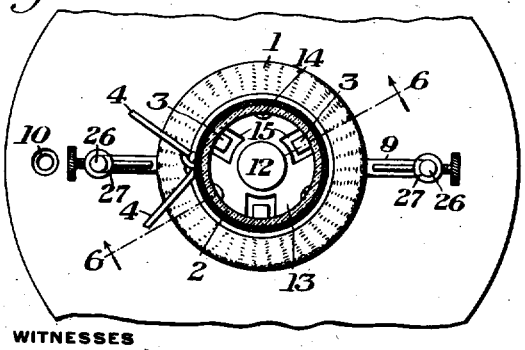
Figure 7:
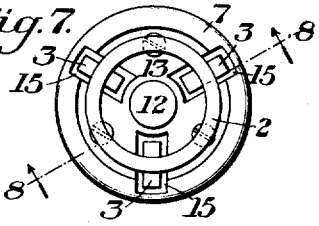
Figure 9:
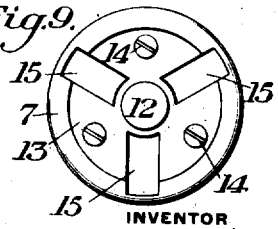
Figure 10:
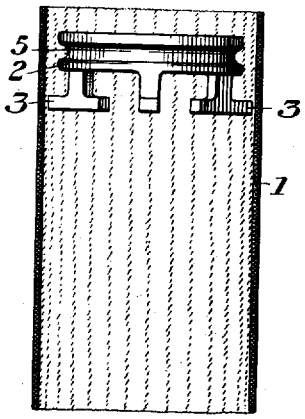
Figure 11:
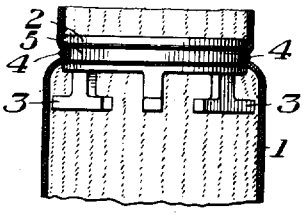
Figure 12:
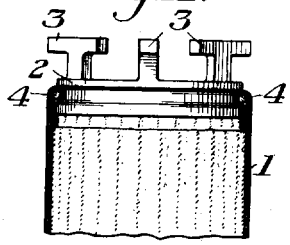

Figure 1 is a perspective view of my improved machine when ready to receive a mantle. Fig. 1ª is a sectional view showing a detail. Fig. 2 is a perspective view of my machine with a mantle in position. Fig. 2ª is a perspective view of a machine, slightly modified. Fig. 3 is a plan view of the structure shown in Fig. 2. Fig. 4 shows the condition of the apparatus when the cap is removed, a plan view being shown. Fig. 5 is a sectional view taken on the line 5—5 of Fig. 6, looking in the direction of the arrows. Fig. 6 is a sectional view taken on the line 6—6 of Fig. 5, looking in the direction of the arrows. Figs. 7, 8 and 9 are detailed views showing the top of the spindle. Figs. 10, 11 and 12 show the mantle and ring in various positions to illustrate the hand method of securing them together.

Throughout the various views of the drawings similar reference characters designate similar parts.

The method of securing a ring to a mantle or stocking heretofore in vogue is best shown in Figs. 10, 11 and 12, where the mantle 1 has a ring 2 placed inside its mouth. This placing of a ring in the mouth of a mantle is a delicate operation and requires great care because a mantle is easily torn or injured and the projecting lugs 3 are apt to engage the webbing of the mantle and tear the same.

In Fig. 11 the mantle and ring are shown after the string 4 has been placed and drawn tight thereby forcing the mantle into the groove 5 of the ring 2.

Fig. 12 shows the mantle and ring after the next operation which is the turning of the mantle inside out so that both the string and groove are concealed. This last step is common to my improved method when my apparatus is used and to the method heretofore in vogue. When the string is placed as shown in Fig. 11, as stated above, it is practically impossible to draw this string so as to contract the mantle evenly. Some parts will be contracted more than others so that the reduced portion of the mantle will be full in one or more places, thereby destroying the symmetry of the mantle, thereby unduly stretching certain parts and compressing others.

In view of the foregoing, my improved apparatus and its operation will be readily understood. The apparatus consists essentially of a base 6 on which is a spindle 7, mounted by a cap 8 and at the foot of the spindle and just above the base is a string guide or holder 9.

The base 6 is preferably a circular disk made of wood or any other suitable material and it may be provided with screw holes 10 or other suitable means for holding this base to the support on which it rests.

From the center of the base 6 rises the spindle 7 and it is fixed to the base in any suitable manner as by screws, not shown, or by a mortise and tenon joint, or any other suitable means, not shown. At the base of the spindle and just above the base 6 is a perforation 11, extending through the spindle and in this perforation 11 is pivotally mounted the string guide or holder which will be more particularly described below. The spindle 7 is circular in cross section, and its circumference is the same as the mantle placed upon it so that a mantle 1 can be placed thereon without stretching beyond its elastic limit. The upper end of this spindle 7 is provided with a concentric dowel pin 12 and at the base of this dowel pin is a recess 13 which is concentric both with the spindle 7 and dowel pin 12 and is made of any suitable depth. The bottom of this recess 13 has three screws 14 so that by turning these screws either up or down the ring 2 can be raised or lowered in the recess 13 so that the groove in the ring will be exactly opposite the upper edge of the spindle 7. Midway between the screws 14 are openings 15 which are sufficiently large to receive the lugs 3 on the ring 2 without interference. Provided they are sufficient for this purpose and are not large enough to materially weaken the apparatus the size of these openings 15 is not material.

The cap 8 may be conical in form or any other suitable shape, but is preferably given an outline of an ordinary conical bullet, and is provided with a center hole 16 concentric with the axis of the cap 8 and a proper size to fit upon the dowel 12, with a loose fit so that the cap can be readily removed. This cap is also provided with a recess 17 concentric with its axis and with the same diameter as the recess 13. The outside diameter of the cap at its base is the same as the diameter of the spindle 7. Near the lower end of the cap 8 are parallel grooves 18, 19, 20 which serve as marks or gages to tell the operator where the upper end of the mantle should be when it is placed in position on the apparatus.

The string guide 9 is provided at its lower end with two flattened surfaces 21 and 22 respectively, the surface 21 being on the side and the surface 22 on the bottom when the spring guide is vertical, its flat surface being at substantially right angles to each other and one or the other of these surfaces is in contact with a plug 23 pressed by a spring 24 which is held in a suitable opening 25 in the base 6. The object of this spring and plug and the flat surfaces is to cause the holder 9 to remain in a vertical position or in an inclined position where it will be out of the way, as desired by the operator. The holder 7 also has two vertically disposed arms 26 at the upper ends of which are adjustable eyes 27, one on each, which have converging fingers with a small space between them immediately opposite the bottom of the cap 8 and the top of the spindle 7 when the holder is in its vertical position. If desired, a guide 27ª may be substituted for the eyes 27, as shown, in Fig. 2ª.

From the foregoing, the operation of my improved device will be readily understood. The cap 8 is first removed and a ring 2 is placed on the spindle 7 with its projections 3 in the openings 15 and its annular portion resting on the screws 14 so that its groove is abreast of the top of the spindle 7. The cap 8 is then put in position and the ring 2 is completely concealed. The mantle or stocking is then placed on the cap 8 and slides readily therefrom onto the spindle 7 and is drawn down until its upper end is even with one of the grooves 18, 19 or 20, at the volition of the operator. The string holder or guide 9 is then raised to a vertical position, a string 4 is passed through the eyes 27 and tied tight, the usual asbestos string being preferably employed. As this string is drawn tight the mantle is thrown positively and firmly against the spindle 7 and cap 8 where they come together, and is evenly drawn against these parts thereby separating them and forcing itself against the ring 2 where it is secured in the groove 5 by the string 4. The mantle is then removed from the spindle and carries with it the ring about which it has been evenly distributed. The mantle is then turned wrong side out as indicated in Fig. 12 and the various operations incident to the finishing of the mantle are carried on as heretofore. If the structure shown in Fig. 2ª is employed, the bar 27ª guides the operator in placing the string, as is obvious.

While I have shown and described only one embodiment of my invention, it is obvious that its essential features may be embodied in various other forms so that it is not limited to the precise disclosure herein made, but includes all other structures that fall within the scope of the annexed claims.

What I claim is:—

1. In a device of the class described, a stocking supporting spindle, means thereon for holding a mantle ring in a stocking when the device is in use, and means for guiding a string when a stocking is secured to a ring.

2. In a device of the class described, means for holding a mantle stocking, in combination with means for holding a mantle ring, and means for guiding the application of a securing string to the stocking to secure it to the ring.

3. In a device of the class described, means for holding a stocking, means for holding a ring and means for indicating the correct position of the stocking with regard to the ring, so that when the string is tied around the stocking the ring and stocking will be held together in proper relation.

4. In a device of the class described, means for holding a stocking, means for holding a ring, said ring holding means having devices capable of adjustment so that when a string is tied about said stocking and secures the same to the ring, the ring and stocking will be held in proper relation.

5. In a device of the class described, means for holding a stocking, means for holding a ring, and means for guiding a string, said string guiding means including a mechanism for holding the said string guiding means in a vertical or in an inclined position.

6. In a device of the class described, a spindle and cap and means for holding a ring between said spindle and cap.

7. In a mantle tying device, a spindle having a mantle ring recess in its upper end, a guide to guide the securing string around the mantle ring and a cap provided with a ring recess corresponding to the recess in the spindle.

8. In a device of the class described, a spindle, a cap resting on said spindle, means for holding said cap and spindle in proper relation and a string guide having eyes with openings opposite the top of the spindle and the bottom of the cap.

9. In a device of the class described, a spindle, a cap resting on said spindle, a string guide adjacent to said spindle and recesses between said cap and spindle adapted to receive a ring, said cap and spindle being so shaped as to form a groove on their exterior surfaces where one rests on the other.

10. In a device of the class described, a cap and spindle, each provided with means to receive a portion of a ring, one resting on the other and both circular in cross section and shaped to form a groove on their exterior surfaces where the cap rests on the spindle so that when a string is secured around a mantle webbing, the same is contracted evenly between said cap and spindle.

11. A hand tool for use in tying mantles to mantle rings, comprising a spindle, and means for holding one end of the spindle, the free end of said spindle having a recessed seat portion of less depth than a mantle ring to receive and hold a mantle ring in projecting relation to the spindle.

12. A hand tool for use in tying mantles to mantle rings comprising a spindle having an external cylindrical mantle holding and guiding surface, and means for holding one end of the spindle, the free end of the spindle having a recessed seat to receive a mantle ring, said seat being of smaller diameter than the guiding and holding portion of said spindle.

13. A hand tool for use in tying mantles to mantle rings, comprising a spindle having a cylindrical mantle holding and guiding surface, means for holding one end of the spindle, the other free end of the spindle having a seat for a mantle ring of smaller diameter than the guiding and holding portion of said spindle and provided with slots to receive and hold the legs of the mantle ring.

14. A hand tool for use in tying mantles to mantle rings comprising a spindle having a cylindrical mantle holding and guiding surface, means for holding one end of the spindle, the other free end of the spindle having a seat to receive a mantle ring, and a movable cap engaging an extension of the spindle and coacting with the seat for the mantle ring.

15. A hand tool for use in tying mantles to mantle rings comprising a spindle having a mantle holding and guiding surface, means for holding one end of the spindle, the other end of the spindle having a seat to receive the mantle ring of smaller diameter than the spindle proper, a central projecting pin of smaller diameter than the seat, and a cap arranged to movably engage the pin and aid in guiding the mantle as it is drawn over the spindle.

16. A hand tool for use in tying mantles to mantle rings, comprising a cylindrical spindle having a mantle holding and guiding surface, means for holding one end of the spindle, its other free end having a seat to receive a mantle ring of smaller diameter than the spindle body, a central projecting pin of smaller diameter than the seat, and a cap arranged to movably engage the pin and aid in guiding the mantle as it is drawn and stretched over the spindle, said cap also being arranged to hold the mantle ring against endwise displacement.

17. A hand tool for use in tying mantles to mantle rings, comprising a spindle having a mantle holding and guiding surface, means for holding one end of the spindle, its other free end having a seat to receive a mantle ring, a pin projecting centrally from said seat, and a removable cap engaging the pin.

In testimony whereof, I have hereunto set my hand this second day of March 1911.

SAMUEL COHN.

Witnesses:
ADOLF EISNER,
HENRY HASPER.

Copies of this patent may be obtained for five cents each, by addressing the "Commissioner of Patents, Washington, D. C."